US010640404B2

(12) United States Patent
Whitaker et al.

(10) Patent No.: US 10,640,404 B2
(45) Date of Patent: May 5, 2020

(54) WATER TREATMENT SYSTEM AND METHOD

(71) Applicant: WATERWERX PTY LTD, Braeside (AU)

(72) Inventors: Michael James Whitaker, Noble Park (AU); Alastair Lockey, Canterbury (AU); Abhyuday Bhartia, Mulgrave (AU); Peter John Meikle, Mont Albert (AU); Sharmen Rajendran, Oakleigh East (AU)

(73) Assignee: WATERWERX PTY LTD. (AU)

( * ) Notice: Subject to any disclaimer, the term of this patent is extended or adjusted under 35 U.S.C. 154(b) by 251 days.

(21) Appl. No.: 15/489,967

(22) Filed: Apr. 18, 2017

(65) Prior Publication Data

US 2017/0297929 A1     Oct. 19, 2017

(30) Foreign Application Priority Data

Apr. 18, 2016 (AU) ................................ 2016901447
Jan. 31, 2017 (AU) ................................ 2017900269

(51) Int. Cl.
  *C02F 1/52* (2006.01)
  *C02F 1/00* (2006.01)
  (Continued)

(52) U.S. Cl.
  CPC ............ *C02F 1/5209* (2013.01); *C02F 1/008* (2013.01); *C02F 1/24* (2013.01); *C02F 2103/34* (2013.01);
  (Continued)

(58) Field of Classification Search
  None
  See application file for complete search history.

(56) References Cited

U.S. PATENT DOCUMENTS 4,855,061 A    8/1989   Martin
7,303,685 B2  12/2007  Clark
(Continued)

FOREIGN PATENT DOCUMENTS

JP        H07275882        10/1995

OTHER PUBLICATIONS

PCT/AU2017/050317 International Search Report and Written Opinion—Applicant: Waterwerx Pty Ltd., dated Jun. 30, 2017.
(Continued)

*Primary Examiner* — Richard C Gurtowski
(74) *Attorney, Agent, or Firm* — Crowe & Dunlevy; Terry L. Watt

(57) ABSTRACT

Disclosed herein is a water treatment system for connection to a water treatment plant (e.g. a dissolved air flotation device). The plant may have an inlet for the receipt of feed water (e.g. waste water) and an outlet for the discharge of treated water. The treatment system may comprise a first sensor disposed such that it is in fluidity communication with the feed water, and a second sensor disposed such that it is in fluidity communication with the treated water. The first and second sensors may be configured to sense parameters of the feed and treated water. The system may further comprise a first applicator (e.g. a pump) that is configured to discharge a treatment source (e.g. a chemical source) to the plant to treat the feed water. The disclosed system may be used to treat waste water (e.g. the treatment of effluent from oil refineries, petrochemical and chemical plants, natural gas processing plants, paper mills and general water treatment). The system has analogous applications in other processing methods that also use DAF, or very similar, systems, such as the processing of mineral ores and other such solid extraction processing methods.

5 Claims, 8 Drawing Sheets

(51) Int. Cl.
*C02F 1/24* (2006.01)
*C02F 103/34* (2006.01)

(52) U.S. Cl.
CPC .. *C02F 2209/001* (2013.01); *C02F 2209/003* (2013.01); *C02F 2209/006* (2013.01); *C02F 2209/008* (2013.01); *C02F 2209/02* (2013.01); *C02F 2209/06* (2013.01); *C02F 2209/10* (2013.01)

(56) References Cited

U.S. PATENT DOCUMENTS

| | | |
|---|---|---|
| 7,993,526 B2 | 8/2011 | Dunbar |
| 8,515,581 B2 | 8/2013 | Piironen et al. |
| 2008/0047903 A1 | 2/2008 | Morse |
| 2013/0213895 A1 | 8/2013 | Criswell |
| 2013/0233796 A1 | 9/2013 | Rao et al. |
| 2016/0362305 A1 | 12/2016 | Ohtsuki et al. |

OTHER PUBLICATIONS

Australia Patent Application Serial No. 2016901447, filed Apr. 18, 2016, International-Type Search Report, dated Aug. 5, 2016.

WATER TREATMENT SYSTEM AND METHOD

TECHNICAL FIELD

The present disclosure relates to the field of water treatment. The present disclosure has particular application to a control and dosing system for a water treatment apparatus.

BACKGROUND ART

While the use of dissolved air flotation devices (DAFs) in water treatment is discussed in detail in this specification, the person skilled in the art will be aware that other water treatment apparatus may be used, and such other apparatus are included within the scope of this invention.

Industrial effluent is a complex mixture comprising dissolved organic and inorganic solids, microbes, colloids and other particles, of various sizes, charges and polarities. The dynamic and composite nature of industrial effluent makes it extremely difficult to treat effectively.

Different sources of industrial effluent require markedly different treatment strategies. For example, the meat industry produces effluent containing large amounts of organic materials, whereas mining processes can generate waste water containing high levels of metal ions and minerals. The composition and flow rate of effluent streams fluctuate constantly, depending on the time of day, the processes being undertaken further upstream and even weather conditions.

Clarifiers and DAF systems are common and relatively versatile methods of treating industrial effluent. These systems have been around for decades with little innovation in relation to their design and operation. DAF systems are used in the treatment of industrial effluents from a variety of processing plants, to remove suspended solids as well as other contaminants such as oil and grease from the effluent. The effluent or feed water is added at one end of a DAF system, as depicted in FIG. 1, and treated with chemicals such as coagulants, acids and bases which act to destabilize colloidal material, causing these to come out of suspension. Upon demobilization of these materials, flocculants are typically added to collect and aggregate these particles and other contaminants to make larger particles. This is done to improve the separation of the solids from the liquid phase of the waste water. Compressed air is also introduced into the effluent stream, typically in a recirculation loop, leading to the formation of dissolved air. When this stream is released at atmospheric pressure in the DAF, the bubbles formed by the air coming out of solution draw the suspended matter to the surface of the DAF system. The floated solids can then be skimmed off the surface of the tank, resulting in clarified water being generated and discharged at the other end of the DAF system.

Due to the diverse composition of industrial effluent and the complex interactions between these components, the optimum chemical dosage to treat a particular effluent stream through a DAF system is impossible to predict theoretically. This complexity is compounded by the fact that the flow rate and composition of the effluent stream changes continuously over time. Therefore, the optimum chemical dosing mixture must be determined empirically and in situ.

Following treatment using a DAF system, the clarified water is typically either recycled or discharged into the sewer as trade waste. For example, the clarified water can be reused on-site if it is of an acceptable quality, further reducing operating costs. If the clarified water is discharged as trade waste, then the industries that discharge it need to ensure that the water meets the standards set by the relevant regulatory bodies. The discharged water usually requires further treatment by a regulatory body to comply with relevant environmental standards. The cost of treating discharged water is based on the contaminants present in the waste water; the higher the contaminant loading, the more expensive it is to treat the discharged water. Hence, most sites that generate liquid effluent will attempt to treat the water and remove as much of the contaminants as possible before discharging the water to reduce the fees payable to the relevant regulatory body.

Although the water quality can be increased by, for example, increasing the volume of certain chemicals added to the water treatment process, the additional chemical cost leads to an increase in the overall cost of the treatment process. Industries with waste water treatment plants will generally overdose these chemicals so as to not risk getting fined by the relevant regulatory body for discharge non-compliance.

Typically, the chemical dosage is determined through trial and error. The chemical service provider will typically recommend a combination of chemicals to treat the waste water based on initial trials. Generally, an operator is employed to determine the best combination of these chemicals to add to the waste water treatment system to obtain acceptable solids removal; this is done through a series of tests, termed 'jar tests', to simulate the conditions in a DAF system.

Jar tests involve taking samples from the effluent stream and manually dosing the samples with the chemicals that are being used in the DAF system, which are typically recommended and supplied by a specialist chemicals supplier. A number of tests, in which the chemical dosages are varied, are performed and the solids removal efficacy is determined visually or on some occasions by measurement. The samples taken from the effluent stream reflect the composition of the stream at that specific point in time. The optimum chemical dosage determined by ajar test will only be applicable to a waste water sample that has similar properties to the test sample, whereas the effluent stream may have substantially altered during the time of the jar test. Jar testing is thus an inherently inaccurate and time-consuming process which is often difficult to perform, resulting in many waste water treatment plants being operated at sub-optimal conditions, increasing chemical consumption while producing low quality treated water.

A jar test is also not an accurate representation of the process within a DAF system. A jar test is unable to adequately replicate the complex mechanics, chemistry and hydrodynamics that are present during the operation of a DAF system, which fundamentally aid in the separation of the solids from the liquid.

In reality, the composition and flow rate of an effluent stream is rarely constant. The optimum dosage of chemicals to treat a given effluent stream will change constantly, and often significantly, depending on changes occurring further upstream relating to variations in the processes as well as changes to the flow rate and composition of the effluent. In a traditional DAF system, even with an experienced, highly skilled human operator to manipulate the chemical dosages, the quality of the treated water is likely to fluctuate considerably, on account of the constantly changing nature of the effluent stream. In practice, this means that a treatment regime which meets the discharge limits one day may not meet those limits on another day, which may lead to the imposition of non-compliance fines.

Some DAF systems attempt to improve their adaptability to fluctuating inputs by implementing control systems to automatically adjust some of the parameters of the system in response to changes in the incoming effluent stream. These DAF systems often use proportional-integral-derivative (PID) control loops or components thereof. PID control loops are programmed to maintain a particular variable, such as the pH or flow rate of an effluent stream, at a constant value by adjusting a parameter of the system. PID loops are effective at maintaining variables that change in a predictable way. For example, a PID controller can maintain the pH of an effluent stream at a particular value by adjusting the proportions of acid and base in the system or proportionally increase the dosage of chemicals based on the flow rate of the effluent. However, when dealing with multiple variables that are influenced by a myriad of underlying factors, such as the dosage of coagulants and flocculants and residence time in a DAF process, PID controllers are not very effective. Optimized waste water treatment systems require the simultaneous adjustment of multiple parameters and thus require a different control method.

The management of water treatment may be performed by water treatment companies that also supply the chemicals for water treatment. This may provide a conflict of interest for the water management company between minimizing the chemical dose to reduce costs for the client and maximizing the chemical dose (e.g. applying excess qualities of chemicals and/or applying unnecessary chemicals) to increase profits for the company.

SUMMARY

Disclosed herein is a water treatment system for use with an apparatus which receives feed water and releases treated water. The system comprises:

one or more feed water sensors to measure in substantially real-time a water quality metric of the feed water;

one or more treatment sources to apply one or more treatments to the feed water;

one or more treated water sensors to measure in substantially real-time a water quality metric of the treated water; and a processor and memory, the memory storing instructions that, when executed by the processor, cause the system to:
   receive data associated with the water quality metric of the feed water from the one or more feed water sensors and data associated with the water quality metric of the treated water from the one or more treated water sensors; and
   control the application of treatments from the one or more treatment sources;

the memory storing further instructions that, when executed by the processor, cause the system to operate in a first mode or a second mode, wherein in the first mode:

(a) the system implements the application of the one or more treatments from the treatment sources in accordance with an initial set of values and then monitors in substantially real-time the water quality metric of the treated water;

(b) conducts a series of tests in which the application of each of the treatments is systematically varied from the initial value and monitors in substantially real-time the water quality metric of the treated water;

(c) generates a model of the relationship between the application of the treatments and the water quality metric of the treated water;

(d) selects a set of commissioning values from the model for the application of the one or more treatments that correspond to a best value for the water quality metric of the treated water;

(e) repeats steps (a) to (d) using the set of commissioning values from step (d) as the initial set of values until either
   (i) the water quality metric of the treated water falls within a pre-determined water quality value, or
   (ii) there is no measurable improvement in the water quality metric as the application of the treatments is varied;

(f) after either
   (i) the water quality metric of the treated water falls below a pre-determined value, or
   (ii) the controller determines that there is no measurable improvement in the water quality metric as the application of the treatments is varied,
then the system selects a set of commissioned values for the application of the treatments which provides a desired water quality result;

and wherein in the second mode;

(g) the system outputs instructions to the one or more treatment sources to apply the treatments using the commissioned set of values from step (f) and continues to monitor in substantially real-time the water quality metric of either or both the feed water and the treated water;

(h) if the controller detects that the water quality metric is outside
   (i) the desired water quality result, and/or
   (ii) a pre-determined range from the values measured during the first mode,
for a pre-determined period of time, then the controller will implement the first mode again.

In some forms, the best value for the water quality metric of the treated water is the value, or set of values, that corresponds to a lowest value of the water quality metric.

In some forms, in the second mode, the set of operating parameters are constantly manipulated (e.g. refined) to ensure that the lowest TSS or best water quality is achieved.

A person skilled in the art would recognize that the model generated at step (c) may be any computer-generated model of the relationship between the application of treatments and the water quality metric of the treated water. These models may include, but are not limited to, sets of equations or graphical representations thereof.

A person skilled in the art would recognize that the best value for the water quality metric or measured proxy (e.g. chemical oxygen demand) of the treated water in step (d) above will depend on the water quality metric itself. For example, if the water quality metric is total suspended solids (TSS), the best value would be the lowest value of TSS that results from the application of the one or more treatments.

By allowing the user to determine a desired water quality result, the present invention considers not only the cost of input chemicals to be controlled, but also the cost of discharge of the treated water. Higher quality water generally attracts lower discharge costs, given that these costs are generally proportional to the amount of contaminants contained therein (although other factors may also play a role). In a facility with multiple waste water discharge points, the cost savings of discharging high quality waste water at one of the discharge points could be used to offset the costs of discharging lower quality waste water at one or more of the other discharge points. In some forms, the disclosed method may serve to reduce or even eliminate non-compliance with the discharge water.

The present invention may also be used to produce waste water containing the minimum amount of contaminants, irrespective of the costs involved. This would have applications in areas that are highly sensitive to water contamination; for example, when the treated water is discharged into waterways. In some forms, the user may be able to choose between three set point options. In the first option, the user may select the lowest chemical consumption for a given water quality (e.g. "minimum chemical usage"). In the second option, the user may select the highest quality water regardless of chemical consumption (e.g. "best water quality"). In the third option, the user may select the lowest aggregate of chemical cost plus trade waste cost (e.g. "minimum overall cost").

In at least one embodiment, the tests involve varying the application of the treatments within a specified range from the initial value.

In at least one embodiment, the models are generated using response surface methodology (RSM). In some forms, alternative modeling techniques may be implemented in lieu of or in combination with RSM methodology (e.g. alternative optimization algorithms and processes such as convex optimization). In some forms, the modeling utilizes a 'steepest descent' technique. In some forms, alternative techniques may be implemented in lieu of or in combination with form a steepest decent technique (e.g. a single-layer or multi-layer perception neural network).

In at least one embodiment, the apparatus includes a dissolved air flotation device (DAF).

In at least one embodiment, the water quality metric is total suspended solids (TSS).

In at least one embodiment, the one or more treatment sources comprises one or more chemical dosing pumps. This embodiment is useful whereby the waste water stream just requires a flocculant, or another chemical that serves a similar function, in which case the system may still generate a dosing curve. In some forms, the one or more treatment sources comprises two or more chemical dosing pumps.

In at least one embodiment, the desired water quality result is nominated by the user for use in the second (operation) mode.

In at least one embodiment, the system further comprises communication apparatus to transmit and/or receive data to/from a remote device (e.g. in the "cloud", on a server, in an email, etc.), including the sensor data and/or the values for the application of the treatments and/or messages, including alarms. In some forms, there may be pre-set values stored in the memory of the system that can be selected by the user before initializing the commissioning stage.

In at least one embodiment, the system further comprises a camera to obtain images and/or videos from the water treatment system, wherein the communication apparatus transmits the images and/or videos to the remote device.

Also disclosed herein is a computer implemented method for treating feed water in a water treatment system. The method comprises a first mode and a second mode, wherein the first mode comprises (a) applying one or more treatments from one or more treatment sources in accordance with an initial set of values (e.g. received from a database in communication with a processor) and monitoring in substantially real-time a water quality metric of the treated water;

(b) conducting (e.g. using the processor) a series of tests in which the application of each of the treatments is systematically varied from the initial value and monitoring in substantially real-time a water quality metric of the treated water;

(c) generating (e.g. using the processor) a model of the relationship between the application of the treatments and the water quality metric of the treated water;

(d) selecting a set of commissioning values (e.g. using the processor) from the model for the application of the one or more treatments that correspond to a best value for the water quality metric of the treated water;

(e) repeating steps (a) to (d) using the set of commissioning values from step (d) as the initial set of values until either
   (i) the water quality metric of the treated water falls below a pre-determined water quality value, or
   (ii) there is no measurable improvement in the water quality metric as the application of the treatments is varied; and (f) after either
   (i) the water quality metric of the treated water falls within a pre-determined value, or
   (ii) there is no measurable improvement in the water quality metric as the application of the treatments is varied,
selecting (e.g. using the processor) a set of commissioned values for the application of the treatments which provides a desired water quality result;

wherein the second mode comprises;

(g) applying (e.g. using the processor) the treatments using the commissioned set of values from step (f) and continuing to monitor in substantially real-time the water quality metric of either or both of the feed water and the treated water; and (h) if the water quality metric is
   (i) outside the desired water quality result, and/or
   (ii) a pre-determined range from the values measured during the calibration mode,
for a pre-determined period of time, implementing the first mode again.

In at least one embodiment, the water treatment system includes a communication apparatus to transmit and/or receive data to/from a remote device, including the sensor data and/or the values for the application of the treatments and/or messages, including alarms.

In at least one embodiment, the water treatment system includes a camera to obtain images and/or videos from the water treatment system, wherein the communication apparatus transmits the images and/or videos to the remote device.

Also disclosed herein is a water treatment system for connection to a water treatment plant, the plant having an inlet for the receipt of feed water and an outlet for the discharge of treated water. The treatment system may comprise;

a first sensor disposed such that it is in fluidity communication with the feed water, the first sensor being configured to sense a first parameter of the feed water;

a second sensor disposed such that it is in fluidity communication with the treated water, the second sensor being configured to sense a second parameter of the treated water;

a first applicator connected to a first treatment source and to the plant, the first applicator configured to discharge the first treatment source to the plant; and a processor and memory connected via a data network, the memory storing instructions that, when executed by the processor, cause the system to:
   receive first data values from the first sensor and second data values from the second sensor, the first data values being associated with the sensed first parameter of the feed water and the second data values being associated with the sensed second parameter of the treated water;

conduct a plurality of treatment tests, each test comprising generating test instructions, outputting the test instructions to the first applicator to discharge the first treatment source to the plant, receiving the second data values from the second sensor, and storing the received second data values;

generate modeling data in dependence on the plurality of tests, the modeling data being representative of a relationship between the first treatment source discharged to the plant and the second data values, and generate dosing instructions in dependence on the generated modeling data, and output the generated dosing instructions to the first applicator.

In some forms, the first parameter of the feed water is TSS or pH and the second value of the treated water is TSS or pH.

In at least one embodiment, the first applicator comprises a first pump, the first pump being fluidically connected to the plant and the first treatment source.

In at least one embodiment, the first pump is configured to discharge a variable flow rate of the first treatment source to the plant.

In at least one embodiment, the system further comprises;

a second applicator connected to a second treatment source and to the plant, the second applicator configured to discharge the second treatment source to the plant; and wherein each test further comprises outputting the test instructions to the second applicator to discharge the second treatment source to the plant.

In at least one embodiment, the second applicator comprises a second pump, the second pump being fluidically connected to the plant and the second treatment source and configured to discharge a variable flow rate of the second treatment source to the plant In at least one embodiment, the modeling data is representative of a relationship between the first treatment source discharged to the plant, the second treatment source discharged to the plant, and the second data values (e.g. values corresponding to the outlet TSS or outlet pH).

In at least one embodiment, the memory stores instructions that, when executed by the processor, cause the system to output the generated dosing instructions to the first and second pumps.

In at least one embodiment, the system further comprises:

a third sensor disposed such that it is in fluidity communication with the feed water, the third sensor being configured to sense a third parameter of the feed water; and a fourth sensor disposed such that it is in fluidity communication with the treated water, the fourth sensor being configured to sense a fourth parameter of the treated water;

the memory storing further instructions that, when executed by the processor, cause the system to receive and store the third data values from the third sensor and fourth data values from the fourth sensor, the third data values being associated with the sensed third parameter of the feed water and the fourth data values being associated with the sensed fourth parameter of the treated water.

In at least one embodiment, the modeling data is representative of a relationship between the first treatment source discharged to the plant, the second treatment source discharged to the plant, and the first, third and fourth data values. In some forms, the first, third and fourth data values relate to inlet pH, inlet TSS and outlet TSS respectively. In this embodiment, outlet pH is not taken into account (i.e. not modeled).

In at least one embodiment, the plurality of tests comprises a first test, the memory storing further instructions that, when executed by the processor, cause the system to select first test instructions for the first test and output the first instructions to the first and second applicators, and store the sensed first, third and fourth data values (e.g. the second value, outlet pH may not be modeled). In some forms, the sensed second data value is also stored during the first test.

In at least one embodiment, the memory stores further instructions that, when executed by the processor, for a subsequent test, cause the system to select varied test instructions in dependence on the sensed first, third and fourth data values stored during the first test, output the varied test instructions to the first and second applicators, and store the sensed first, third and fourth data values (e.g. the second value, outlet pH may not be modeled). In some forms, the sensed second data value is also stored during the subsequent test. In some forms, the system may comprise a plurality (e.g. more than two) applicators.

In at least one embodiment, the memory stores further instructions that, when executed by the processor, for each subsequent test, cause the system to select varied test instructions in dependence on the sensed second and fourth data values stored during the previous test, output the varied test instructions to the first and second applicators, and store the sensed second and fourth data values.

In at least one embodiment, the memory stores further instructions that, when executed by the processor, cause the system to conduct a predetermined number of tests. In some forms, the predetermined number of tests is 1 to 50. In some forms, the predetermined number of tests is 10 to 30. In some forms, the predetermined number of tests is 20 to 30. In some forms, the predetermined number of tests is 27. Following the completion of the predetermined number of tests, the system may select the parameters that correspond to the lowest outlet TSS from the conducted tests, then the system repeats a further number of pre-determined tests using this point as the starting point for the further of tests.

In at least one embodiment, the memory stores further instructions that, when executed by the processor, cause the system to monitor one or more of the first, second, third and fourth data values associated with the first, second, third and fourth parameters respectively following the generation and output of the dosing instructions to the first and second applicators, and generate varied dosing instructions in dependence on the monitored values. In some forms, the system may monitor more than four parameters (e.g. the system may include more than four sensors).

In at least one embodiment, the memory stores further instructions that, when executed by the processor, cause the system to monitor one or more of the first, second, third and fourth data values associated with the first, second, third and fourth parameters respectively following the generation and output of the varied dosing instructions, and when the monitored values are outside a predetermined range of values, re-conduct the plurality of tests and generate revised modeling data in dependence on the plurality of tests.

Also disclosed herein is a water treatment system for a water treatment plant, the plant having an inlet for the receipt of feed water and an outlet for the discharge of treated water. The treatment system may comprise;

a processor and memory connected via a data network, the memory storing instructions that, when executed by the processor, cause the system to:

dynamically receive first data values from a first sensor and second data values from a second sensor, the first data values being associated with a first parameter of the feed water and the second data values being associated with a second parameter of the treated water;

conduct a plurality of treatment tests, each test comprising analyzing the first data values and generating test instructions in dependence on the analysis, outputting the test instructions to a first applicator to discharge a first treatment source to the plant, receiving the second data values from the second sensor following the discharge of the first treatment source to the plant, and storing the received second data values;

generate modeling data in dependence on the plurality of tests, the modeling data being representative of a relationship between the first treatment source discharged to the plant and the second data values, and generate dosing instructions in dependence on the generated modeling data, and output the generated dosing instructions to the first applicator.

In at least one embodiment, the present disclosure addresses one or more of the deficiencies of current water treatment systems by providing a system that dynamically responds to changes in the feed water stream. This delivers a number of benefits over the current state of the art, including one or more of the following:

(a) significantly reduced chemical consumption and trade waste discharge costs;
(b) easier installation and commissioning (e.g. the system may be retrofit ted to existing DAF or other water treatment systems);
(c) reduced installation and commissioning costs; and
(d) in one embodiment, a DAF control system comprising a modular intelligent system that can be remotely-controlled, providing the ability for web-enabled monitoring and on-the-fly control, including video integration.

Also disclosed herein is a treatment system for connection to a treatment plant (e.g. a DAF), the plant having an inlet for the receipt of feed fluid (e.g. a mixture containing minerals for extraction) and an outlet for the discharge of treated fluid (the generated sludge containing minerals is also recovered). The treatment system may comprise; a first sensor (e.g. a pH sensor) disposed such that it is in fluidity communication with the feed fluid, the first sensor being configured to sense a first parameter (e.g. pH) of the feed fluid; a second sensor (e.g. a TSS sensor) disposed such that it is in fluidity communication with the treated fluid, the second sensor being configured to sense a second parameter (e.g. TSS) of the treated fluid; a first applicator (e.g. a pump) connected to a first treatment source (e.g. a chemical source) and to the plant, the first applicator configured to discharge the first treatment source to the plant; and a processor and memory connected via a data network, the memory storing instructions that, when executed by the processor, cause the system to: receive first data values (e.g. values of pH) from the first sensor and second data values (e.g. values of TSS) from the second sensor, the first data values being associated with the sensed first parameter of the feed fluid and the second data values being associated with the sensed second parameter of the treated fluid; conduct a plurality of treatment tests, each test comprising generating test instructions, outputting the test instructions to the first applicator to discharge the first treatment source to the plant, receiving the second data values from the second sensor, and storing the received second data values; generate modeling data in dependence on the plurality of tests, the modeling data being representative of a relationship between the first treatment source discharged to the plant and the second data values, and generate dosing instructions in dependence on the generated modeling data, and output the generated dosing instructions to the first applicator. Advantageously, the system can be used to maximize the separation and extraction of, for example, minerals from sludge. The system may be as otherwise detailed above with respect to the waste water.

BRIEF DESCRIPTION OF DRAWINGS

Various embodiments/aspects of the disclosure will now be described with reference to the following drawings in which.

DETAILED DESCRIPTION

A detailed description of one or more embodiments of the invention is provided below, along with accompanying figures that illustrate by way of example the principles of the invention. While the invention is described in connection with such embodiments, it should be understood that the invention is not limited to any one embodiment. On the contrary, the invention encompasses numerous alternatives, modifications and equivalents.

For the purpose of example, numerous specific details are set forth in the following description in order to provide a thorough understanding of the present invention. The present invention may be practiced according to the claims with some or all of these specific details depending on the embodiment chosen for the purpose. For the purpose of clarity, technical material that is known in the technical fields related to the invention has not been described in detail so that the present invention is not unnecessarily obscured.

The following terminology will be referred with reference to the chemicals used to treat waste water in the disclosed DAF system:

An acid and/or a base, for pH adjustment of the waste water stream to aid in the demobilization of the colloids in the effluent, will generally be referred to as "suspended solids", causing these particles to come out of suspension.

Chemicals that aid in the demobilization of the colloids will generally be referred to as "coagulants". The purpose of a coagulant is to reduce the surface potential of the colloidal particles. Coagulants are typically positively charged molecules which provide an avenue for the colloids to aggregate.

Chemicals that cause particles in a dispersion to form larger aggregates/flocs and come out of solution, easing the separation from the liquid phase and aiding the clarification process, will generally be referred to as "Flocculants".

Figure 1:
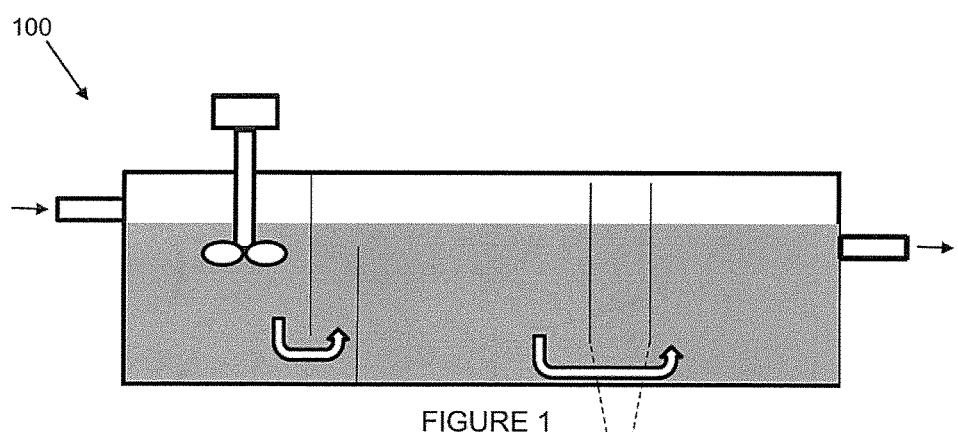
FIG. 1 is a schematic view of a DAF system for water treatment.
Figure 2:
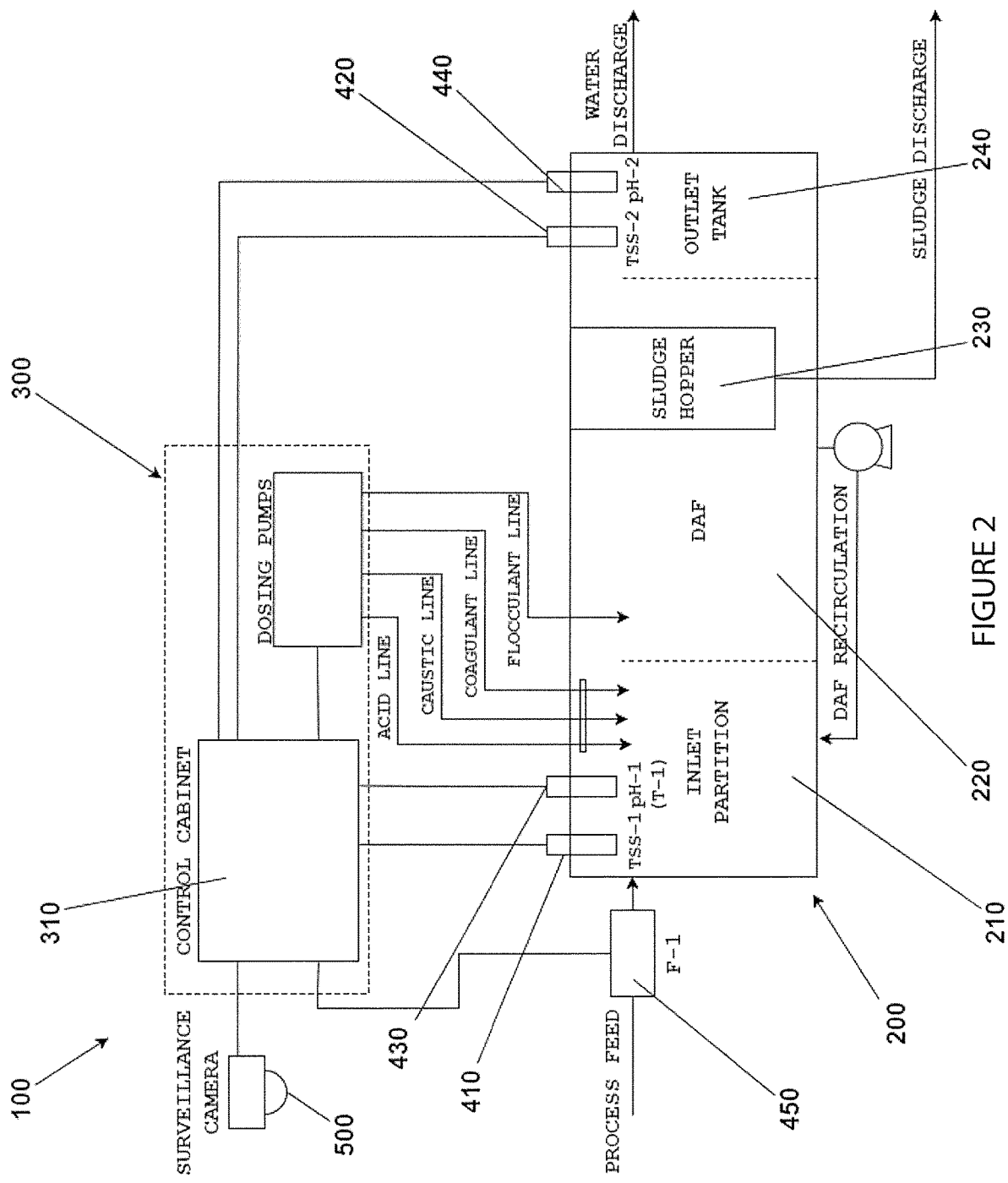
FIG. 2 is a schematic flow diagram depicting the operation of components of a water treatment apparatus according to a representative embodiment of the present invention.

FIG. 2 depicts water treatment apparatus 100 according to a representative embodiment of the present disclosure. In the illustrative embodiment, the treatment apparatus includes a DAF system 200 and a control cabinet 300. In the illustrative embodiment, the control cabinet (e.g. the 'controller') is in the form of an industrial personal computer (IPC). The IPC is located on-site and includes processor and memory resources. As will be evident to the skilled addressee, numerous alternatives to an IPC may be implemented. For example, in one embodiment, an offside PC may be used in lieu of an IPC. In this embodiment, a data network may be implemented to transmit data received from various on-site instruments and equipment to the offside PC. In another embodiment, a programmable logic controller (PLC) may be implemented. In the following description of the illustrative embodiment, the term 'controller' is used generically to describe a computing device having a processor and memory resources configured to store instructions (e.g. software blocks/modules) to carry out specified system functions.

The DAF system 200 receives feed water at one end, into inlet chamber 210, where treatment begins. The partially treated water proceeds to the main DAF chamber 220, where further treatment enables sludge to be generated and transferred into sludge hopper 230, while the treated (i.e., clarified) water enters the outlet chamber 240. The sludge and treated water are then separately discharged.

Figure 3:
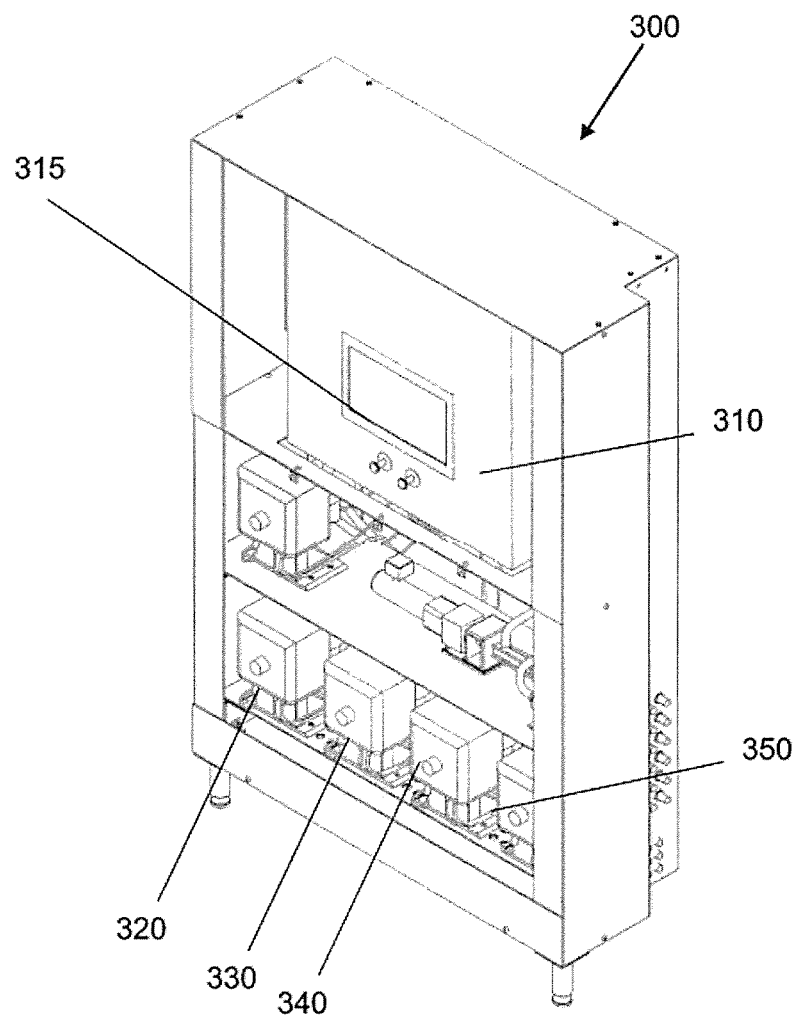
FIG. 3 is a perspective view of a control cabinet for a DAF system according to a representative embodiment of the present invention.
Figure 8:
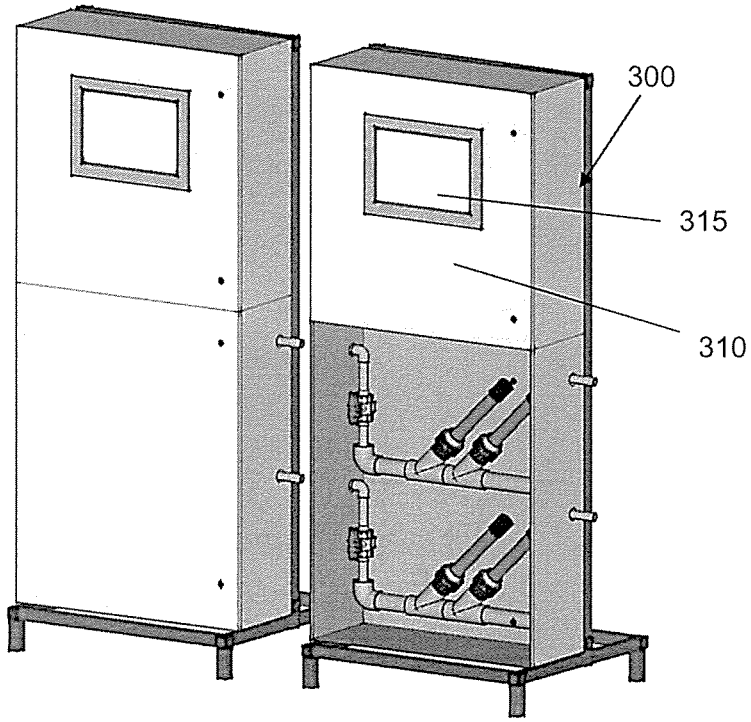
FIG. 8 is a perspective view of an alternative control cabinet for a DAF system according to another embodiment of the present invention.

The control cabinet 300 of the water treatment apparatus, shown in more detail in FIG. 3, operates to apply treatments from one or more treatment sources to the feed water, in response to sensor and instrument data reflective of constantly changing feed water flow rate and composition. In the embodiment shown in FIG. 3, the one or more treatment sources for applying treatments to the feed water are chemical dosing pumps. FIG. 3 depicts both the dosing pumps for treating the water in DAF 200 and controller 310 as being contained within control cabinet 300. In other embodiments, the treatment sources and controller 310 may instead be contained on separate skids (see FIG. 8).

In the embodiment shown in FIG. 2, the water treatment apparatus 100 may include one or more dosing pumps for treating the water in DAF 200 with chemicals selected from the group consisting of an acid dosing pump 320, an alkali dosing pump 330, a coagulant (or a chemical serving a similar function) dosing pump 340, a flocculant (or a chemical serving a similar function) dosing pump 350 and mixtures thereof. The settings of these dosing pumps may be automatically adjustable by controller 310 housed within control cabinet 300. In one embodiment, the controller, which is automatically adjusting the settings of the treatment sources, may be connected to a Human Machine Interface (HMI) to allow a user to interact with the system.

To determine whether an adjustment is required, the controller receives data from a plurality of sensors or instruments that sense a metric (e.g. a parameter) of the water that is indicative of water quality and conducts real-time tests to determine the optimum chemical dosages. In another form, a metric (e.g. a parameter) may be measured that is a proxy for determining another water quality metric (e.g. measuring turbidity as a proxy for TSS levels). In one form, the data sensed by the sensor is outputted to a transmitter, that then transmits the data to the IPC for analysis. In the particular embodiment shown in FIG. 2, there are four sensors, although the number of sensors could be varied in different embodiments. In the embodiment shown in FIG. 2, the water quality metric being measured is the level of total suspended solids (TSS). In other embodiments, a different water quality metric may be measured, such as turbidity. In the embodiment shown in FIG. 2, there are two TSS probes 410, 420, located in the inlet chamber 210 and outlet chamber 240 respectively, which are used to measure the suspended solids or turbidity level of the feed water and the treated water respectively. pH sensors 430, 440 are also located in each of the inlet chamber 210 and the outlet chamber 240 to measure the acidity and/or alkalinity of the feed water and the treated water. Additionally, a flow meter 450 may be provided to measure the flow rate of the feed water as it enters the DAF system. In other embodiments, the various probes and sensors may instead be contained in-line within the control cabinet.

Other sensors, not shown in the embodiment of FIG. 2, may include temperature sensors to determine the temperature of the water in one or more of the DAF chambers, oxygen reduction potential (ORP) sensors, chlorine dioxide sensors, dissolved oxygen sensors, turbidity sensors, streaming current detectors, multi-parameter sensors working on principles such as ultraviolet-visible spectroscopy (UV-VIS), level sensors, pressure sensors, zeta potential sensors, flow sensors and other sensors and probes to aid in optimizing the application of treatments or to detect failures in the system.

Similarly, in other embodiments, the controller 310 may be configured to control settings other than the outputs of the chemical dosing pumps, such as scraper speeds, solenoids, motors, valves, decanters, pumps (other than chemical dosing) and other ancillaries used with a DAF system alongside post treatment processes to further treat the water or sludge.

The controller 310 may include a display 315 to display the sensor data and other information (such as historical information or alarm notifications) to a user. The display 315 may comprise a HMI touch-screen system allowing user input to be received by controller 310, although other user input means may also be used.

The controller 310 may further include, or interface to, communication apparatus to transmit the data to a database or data storage system offside. The communication apparatus may be cabled, but is preferably wireless—for example, a WiFi, Bluetooth or 3G/4G cellular transmitter and/or receiver.

A video/surveillance camera 500 (e.g. an industrial camera) is also provided, and images and/or videos may be transmitted from the video camera 500 to a remote monitoring device to trouble-shoot or identify abnormalities in the operation of the water treatment system.

The present invention enables automatic management and optimization of the treatments used in the water treatment system—in particular, with respect to FIG. 2, the chemical dosing systems that are employed. However, selecting and maintaining appropriate dosing levels is a non-trivial, complex exercise.

The user may nominate a desired water quality result for the treated water from a range of options. In one option, the system may be set manually to provide the "Best Water Quality" i.e., the best possible water quality through the best separation of solids (obtained by optimal and precise dosing of coagulants, flocculants, pH modifiers or combinations thereof). Alternatively, the system may be set manually to provide the "Minimum Chemical Usage" to maintain a nominally acceptable water quality, while using the lowest possible amount of chemicals.

However, in a preferred embodiment of the present invention, a user may set the system to "minimum overall cost" (e.g. balanced or automatic) mode (i.e. Ha mode that corresponds to the minimum aggregate of trade waste and chemical costs) after the commissioning stage, wherein it determines the dosing levels to be applied during operation that result in a reduced overall operating cost of the system. Specifically, the inventors recognize that although highly clarified water may require greater chemical dosing (increasing the overall chemical cost involved in treating the water), the discharge cost of less turbid water is likely to be lower. Accordingly, in the "Automatic" mode, the present invention balances these two costs to lower the overall cost of the treatment process.

Figure 6:
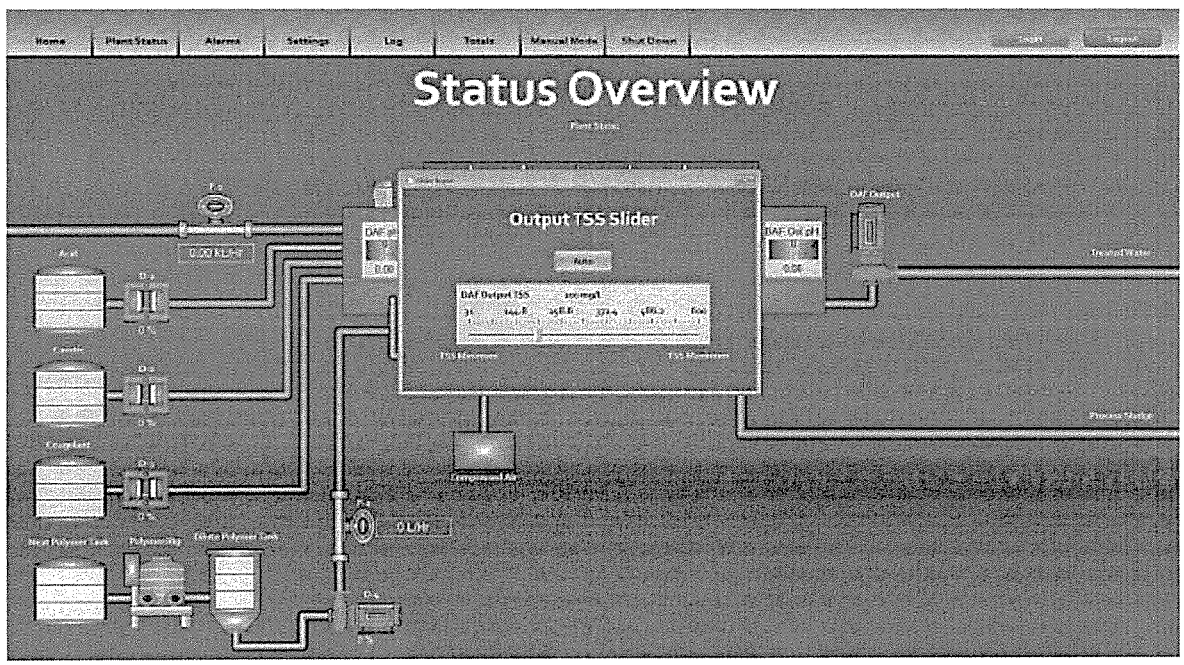
FIG. 6 is a screens hot from a display of a controller according to a representative embodiment of the present invention.

The desired water quality result can be selected by an operator, and set by providing an input to the controller 310 (e.g. via a touch screen 315, via a remote connection, etc.). The setting could, for example, be in the form of a simple on-screen slider, indicating the desired discharge water quality, as shown for example in FIG. 6. In such an embodiment, "Best Water Quality" can be set at the left-most end of the slider, "Minimum Chemical Usage" at the right-most end of the slider, or "Automatic" mode can be selected and the slider will be automatically positioned by the controller based on its calculation of the minimum overall cost of operation.

In "Automatic" mode, the controller 310 will determine after the commissioning mode the appropriate dosing levels used in the water treatment system 100. Specifically, in this embodiment, the controller 310 is provided with an "Automatic Commissioning" capability that allows an installer to set the nominal initial control parameters, that will be subsequently modified in a controlled fashion by an algorithm or a combination of algorithms by means of controller 310 in order to develop a model describing control parameters to achieve the selected objective in an operation mode (e.g. maximum water quality or minimum chemical consumption) in response to the DAF inflows. This may be performed over an initial commissioning period of approximately 10 days. The generation of the model will be described in detail below with respect to an illustrative example.

The nominal initial control parameters may also be retrieved from a remote server, by either suitable cabled or wireless apparatus (e.g. the nominal initial control parameters may be retrieved witlessly from memory located within the cloud).

For illustrative purposes, an example commissioning process is described below. First, upon initialization of the system, the user may select from a choice of default settings, such as "Abattoir", "Dairy", "Oil Dense" or "General" setting. Other default or user-configurable settings may be provided. These may provide default initialization information such as maximum pump speeds, volume of the DAF system, etc.

Of particular note, initialization information may include a typical chemical cost (e.g. $ per liter), to enable the system to compute and monitor the impact of increasing chemical dosing levels. The cost of chemicals as well as trade waste discharge costs can be provided to the controller 310, by a user via touch-screen 315 or from a remote database, in order to allow the controller 310 to calculate the output water quality metric value which results in the minimum total operating cost.

Once the initial parameters are entered into the system, the system can begin a first mode (e.g. "Automatic Commissioning" mode). In this mode, a sequence of initial tests to perform is generated or retrieved from a database (e.g. a remotely connected database) which incorporates a few combinations of values for each of the controlled variables. The number of initial tests performed is limited to a predetermined number based on available commissioning time, and tests are performed in succession until the resulting water quality metric, in this case outlet TSS, falls within an acceptable dead band to begin the RSM and steepest descent tests (e.g. TSS levels of 500 mg/L to 200 mg/L). If all tests are conducted with no results in this band, the lowest result above this dead band is taken as the starting value. This ensures that the algorithm will function correctly without being affected by excessive noise, while starting in close proximity to the minimum value, reducing the number of tests required.

As the tests are conducted by the system in this embodiment, the controller 310 receives the sensor data, intermittently or continuously, and averages it over a time period. An algorithm (e.g. an RSM algorithm) is then used to allow the system to learn how to reduce the overall cost of treating the water. As will be evident to the skilled addressee, an RSM is an example of an algorithm that enables the disclosed system to be automated and other techniques could be implemented (e.g. alternative optimization algorithms and processes such as convex optimization) to automate the system.

The algorithm involves performing Central Composite Design (CCD) tests around the starting point. Once the CCD has been completed, a number of tests are then performed sequentially along the direction found by the CCD to be of steepest descent. When the error margin exceeds a threshold, a new starting point is taken and the process repeats. The tests take place sequentially as long as flow is present and the pH remains consistent and within limits. It will be evident to the skilled addressee that the utilization of 'steepest descent' in the detailed embodiment could take another form (e.g. a single-layer or multi-layer perception neural network), or other methods may be utilized to automated the optimization process such as convex optimization.

For each test, once a certain volume, relative to the volume of the DAF, has passed through the DAF, the weighted average TSS result is stored as the output TSS value of the test.

This continues until a minimum output TSS value is achieved, at which point the value and operating parameters are stored, and a set of full factorial RSM tests are generated, which exclude values where any of the variables a-d increase, as this refers to an unnecessary increase in chemical consumption.

The full factorial sets are then conducted sequentially until complete. The generated full factorial surface is used to find a solution based on the position of the output TSS slider as configured by the user. The data obtained from these tests are used to calculate the outlet TSS for the 'balanced' mode as well as the operating parameters for various points on the slider.

The controlled variables that may be used in the RSM are the following:
(a) pH;
(b) a;
(c) b;
(d) c; and
(e) d In this example embodiment, the variables a-d are used in the coagulant and flocculant dosing equations, which are as follows:

coagulant dosing L/Hr=($a$*Inlet TSS(mg/L)/1000+$b$)*Inlet flow (kL/Hr)  (a)

flocculant dosing L/Hr=($c$*Inlet TSS(mg/L)/1000+$d$)*Inlet flow (kL/Hr)  (b)

Although the above equations relate to the dosing of flocculant and coagulant, a person skilled in the art would recognize that other embodiments of the invention may use different types of chemicals for dosing. Examples of other chemical types that may be dosed include, but are not limited to, precipitation reagents for removing dissolved metals, or water softening agents.

These five variables, plus the outlet TSS, are used to generate a model, in the fours of data associated with a multi-dimensional graph, where combinations of variables are tested and recorded. The initial priority for the "Automatic Commissioning" period is to minimize the outlet TSS concentration. Then, with the relevant chemical and trade waste cost information (i.e., discharge costs of treated water, and/or sludge), the algorithm can be weighted to minimize the overall cost of the treatment process.

Similarly, 'c' and 'd' are coefficients for a first order polynomial dictating the flow value through a flocculant pump that uses the inlet effluent quality metric as the independent variable 'x':

flocculant flow=$c*x+d$

The independent variable 'x' in this context refers to the water quality metric or a proxy.

Given a broader time constraint for the calibration period, a higher order polynomial can instead be used, introducing more coefficients to populate the CCD matrix. Here, $x_n$ is a given coefficient:

$$\text{flow} = \sum_{n=1}^{k} x_n * (\text{inlet } TSS)^{n-1}$$

The model for the response surface is required to find the desired operating point. A computer is required for this due to the arithmetic complexity that is involved. For example, a QR-decomposition of a large square matrix is required when conducting Ordinary Least Squares estimation, which is beyond the capability of a human being.

A polynomial model for the outlet TSS is generated as a function of the variables used in the RSM tests, using the method of linear least squares regression. The surface is then used to evaluate the operating point with the lowest TSS value and shift the variables closer to this optimal value by a pre-determined step size, or by evaluating the gradient of the surface and choosing the operating point leading to the steepest descent. This step size is a function of the duration of the calibration period for each application, and can also be industry specific. A Central Composite Design (CCD) is applied to aid in the population of the operating point matrix, forming the basis of every experiment that is conducted. An example is shown below for a 5-variable experiment: −1 −1 −1 −1 1

| | | | | |
|---|---|---|---|---|
| −1 | −1 | −1 | 1 | −1 |
| −1 | −1 | 1 | −1 | −1 |
| −1 | −1 | 1 | 1 | 1 |
| −1 | 1 | −1 | −1 | −1 |
| −1 | 1 | −1 | 1 | 1 |
| −1 | 1 | 1 | −1 | 1 |
| −1 | 1 | 1 | 1 | −1 |
| 1 | −1 | −1 | −1 | −1 |
| 1 | −1 | −1 | 1 | 1 |
| 1 | −1 | 1 | −1 | 1 |
| 1 | −1 | 1 | 1 | −1 |
| 1 | 1 | −1 | −1 | 1 |
| 1 | 1 | −1 | 1 | −1 |
| 1 | 1 | 1 | −1 | −1 |
| 1 | 1 | 1 | 1 | 1 |
| −2 | 0 | 0 | 0 | 0 |
| 2 | 0 | 0 | 0 | 0 |
| 0 | −2 | 0 | 0 | 0 |
| 0 | 2 | 0 | 0 | 0 |
| 0 | 0 | −2 | 0 | 0 |
| 0 | 0 | 2 | 0 | 0 |
| 0 | 0 | 0 | −2 | 0 |
| 0 | 0 | 0 | 2 | 0 |
| 0 | 0 | 0 | 0 | −2 |
| 0 | 0 | 0 | 0 | 2 |
| 0 | 0 | 0 | 0 | 0 |

In the scenario that the pH reference value and linear operating regimes for coagulant and flocculant are to be used as RSM variables, the following variables can be used: pH, a, b, c and d.

Here, 'a' and 'b' are coefficients for a first order polynomial dictating the flow value through a coagulant pump that uses the inlet effluent quality metric as the independent variable 'x':

coagulant flow=$a*x+b$

The values of the matrix above are in a normalized form and can be used to directly derive a set of testing operating points. The operating point corresponding to the center location (e.g. value) is defined by the context in which the CCD experiment is required. A value of '1' in a cell corresponds to the center value plus the increment value corresponding to the column of the cell where the value is found. The increment value is dependent on the application of the technology and on the identity of the variable.

In a case where a simple option is required to be used, such as when no coagulant is to be used in operation, the variables 'a' and 'b' can be omitted. Doing so reduces the size of the experiment to 15 tests instead of the 27 tests required when 5 variables are used.

| | | |
|---|---|---|
| −1.0000 | −1.0000 | −1.0000 |
| −1.0000 | −1.0000 | 1.0000 |
| −1.0000 | 1.0000 | −1.0000 |
| −1.0000 | 1.0000 | 1.0000 |
| 1.0000 | −1.0000 | −1.0000 |
| 1.0000 | −1.0000 | 1.0000 |
| 1.0000 | 1.0000 | −1.0000 |
| 1.0000 | 1.0000 | 1.0000 |

-continued

| | | |
|---|---|---|
| −1.6818 | 0 | 0 |
| 1.6818 | 0 | 0 |
| 0 | −1.6818 | 0 |
| 0 | 1.6818 | 0 |
| 0 | 0 | −1.6818 |
| 0 | 0 | 1.6818 |
| 0 | 0 | 0 |

For example, when creating a 5-variable CCD experiment, where the variables might be pH, a, b, c and d, the center operating point is [5.9616 0.0067 0.0652 0.4895 0.4416], and the increment vector is [0.1600 0.0004 0.0055 0.0209 0.0445]:

$$\begin{bmatrix} 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \\ 5.9616 & 0.0067 & 0.0652 & 0.4895 & 0.4416 \end{bmatrix} + \begin{bmatrix} -1 & -1 & -1 & -1 & 1 \\ -1 & -1 & -1 & 1 & -1 \\ -1 & -1 & 1 & -1 & -1 \\ -1 & -1 & 1 & 1 & 1 \\ -1 & 1 & -1 & -1 & -1 \\ -1 & 1 & -1 & 1 & 1 \\ -1 & 1 & 1 & -1 & 1 \\ -1 & 1 & 1 & 1 & -1 \\ 1 & -1 & -1 & -1 & -1 \\ 1 & -1 & -1 & 1 & 1 \\ 1 & -1 & 1 & -1 & 1 \\ 1 & -1 & 1 & 1 & -1 \\ 1 & 1 & -1 & -1 & 1 \\ 1 & 1 & -1 & 1 & -1 \\ 1 & 1 & 1 & -1 & -1 \\ 1 & 1 & 1 & 1 & 1 \\ -2 & 0 & 0 & 0 & 0 \\ 2 & 0 & 0 & 0 & 0 \\ 0 & -2 & 0 & 0 & 0 \\ 0 & 2 & 0 & 0 & 0 \\ 0 & 0 & -2 & 0 & 0 \\ 0 & 0 & 2 & 0 & 0 \\ 0 & 0 & 0 & -2 & 0 \\ 0 & 0 & 0 & 2 & 0 \\ 0 & 0 & 0 & 0 & -2 \\ 0 & 0 & 0 & 0 & 2 \\ 0 & 0 & 0 & 0 & 0 \end{bmatrix}$$

$$\begin{bmatrix} 0.1600 & 0 & 0 & 0 & 0 \\ 0 & 0.0004 & 0 & 0 & 0 \\ 0 & 0 & 0.0055 & 0 & 0 \\ 0 & 0 & 0 & 0.0209 & 0 \\ 0 & 0 & 0 & 0 & 0.0445 \end{bmatrix} = \begin{bmatrix} 5.8016 & 0.0063 & 0.0597 & 0.4686 & 0.4861 \\ 5.8016 & 0.0063 & 0.0597 & 0.5105 & 0.3971 \\ 5.8016 & 0.0063 & 0.0707 & 0.4686 & 0.3971 \\ 5.8016 & 0.0063 & 0.0707 & 0.5105 & 0.4861 \\ 5.8016 & 0.0071 & 0.0597 & 0.4686 & 0.3971 \\ 5.8016 & 0.0071 & 0.0597 & 0.5105 & 0.4861 \\ 5.8016 & 0.0071 & 0.0707 & 0.4686 & 0.4861 \\ 5.8016 & 0.0071 & 0.0707 & 0.5105 & 0.3971 \\ 6.1216 & 0.0063 & 0.0597 & 0.4686 & 0.3971 \\ 6.1216 & 0.0063 & 0.0597 & 0.5105 & 0.4861 \\ 6.1216 & 0.0063 & 0.0707 & 0.4686 & 0.4861 \\ 6.1216 & 0.0063 & 0.0707 & 0.5105 & 0.3971 \\ 6.1216 & 0.0071 & 0.0597 & 0.4686 & 0.4861 \\ 6.1216 & 0.0071 & 0.0597 & 0.5105 & 0.3971 \\ 6.1216 & 0.0071 & 0.0707 & 0.4686 & 0.3971 \\ 6.1216 & 0.0071 & 0.0707 & 0.5105 & 0.4861 \\ 5.6416 & 0.0067 & 0.0652 & 0.4895 & 0.4416 \\ 6.2816 & 0.0067 & 0.0652 & 0.4895 & 0.4416 \\ 5.9616 & 0.0058 & 0.0652 & 0.4895 & 0.4416 \\ 5.9616 & 0.0076 & 0.0652 & 0.4895 & 0.4416 \\ 5.9616 & 0.0067 & 0.0542 & 0.4895 & 0.4416 \\ 5.9616 & 0.0067 & 0.0762 & 0.4895 & 0.4416 \\ 5.9616 & 0.0067 & 0.0652 & 0.4477 & 0.4416 \\ 5.9616 & 0.0067 & 0.0652 & 0.5314 & 0.4416 \\ 5.9616 & 0.0067 & 0.0652 & 0.4895 & 0.3526 \\ 5.9616 & 0.0067 & 0.0652 & 0.4895 & 0.5306 \\ 5.9616 & 0.0067 & 0.0652 & 0.4895 & 0.4416 \end{bmatrix}$$

The design matrix X is dependent on whether a full quadratic model for the response surface or a pure quadratic mode is required. A pure quadratic model assumes finite coefficients for all terms in the multi variable polynomial describing the value of the outlet TSS as a function of the operating parameters, except the interaction terms. A full polynomial model includes the interaction terms. For example, when both the coagulant and flocculant are being dosed and the pH set point is within the prescribed tolerances, the polynomial below is used to define the response surface with a pure quadratic mode:

outlet $TSS_{normalised} = x_1 + x_2 * \mathrm{pH}_{normalised} + x_3 * a_{normalised} +$
$x_4 * b_{normalised} + x_5 * c_{normalised} + x_6 * d_{normalised} + x_7 * \mathrm{pH}^2_{normalised} +$
$x_8 * a^2_{normalised} + x_9 * b^2_{normalised} + x_{10} * c^2_{normalised} + x_{11} * d^2_{normalised}$ The following polynomial is used to define the response surface with a full quadratic model:

outlet $TSS_{normalised} =$
$x_1 + x_2 * \mathrm{pH}_{normalised} + x_3 * a_{normalised} + x_4 * b_{normalised} +$ -continued $x_5 * c_{normalised} + x_6 * d_{normalised} + x_7 * \mathrm{pH}_{normalised} * a_{normalised} +$
$x_8 * \mathrm{pH}_{normalised} * b_{normalised} + x_9 * \mathrm{pH}_{normalised} * c_{normalised} +$
$x_{10} * \mathrm{pH}_{normalised} * d_{normalised} + x_{11} * a_{normalised} * b_{normalised} +$
$x_{12} * a_{normalised} * c_{normalised} + x_{13} * a_{normalised} * d_{normalised} +$
$x_{14} * b_{normalised} * c_{normalised} + x_{15} * b_{normalised} * d_{normalised} +$
$x_{16} * c_{normalised} * d_{normalised} + x_{17} * \mathrm{pH}^2_{normalised} + x_{18} * a^2_{normalised} +$
$x_{19} * b^2_{normalised} + x_{20} * c^2_{normalised} + x_{21} * d^2_{normalised}$ To generate the coefficients $x_n$, an Ordinary Least Squares estimator is used:

$$x_n = (X^T * X)^{-1} * X^T * y$$

Here, 'X' is defined as the design matrix, and is dependent on the type of model that is preferred to define the response surface. For a pure quadratic model, the following design matrix is applicable:

$$X = \begin{bmatrix} 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \\ 1 & \text{pH} & a & b & c & d & \text{pH}^2 & a^2 & b^2 & c^2 & d^2 \end{bmatrix}$$

When a full quadratic model is used, the following design matrix is applicable:

The choice of model implemented by the system is a trade-off between accuracy and available computing power. Increasing the number of coefficients, significantly increases the computational time but increases the accuracy of the model. Other models may also be used, such as the quadratic model with interaction terms only, or higher order or non-polynomial models.

Once a polynomial model for the response surface has been generated, as estimate for the operating point with the lowest TSS value cn be made by finding a stationary point in the quadratric surface:

operating parameters $= -\frac{1}{2} * B^{-1} * b$

'B' is defined as:

$$B = \begin{bmatrix} x_{17} & \frac{x_7}{2} & \frac{x_8}{2} & \frac{x_9}{2} & \frac{x_{10}}{2} \\ \frac{x_7}{2} & x_{18} & \frac{x_{11}}{2} & \frac{x_{12}}{2} & \frac{x_{13}}{2} \\ \frac{x_8}{2} & \frac{x_{11}}{2} & x_{19} & \frac{x_{14}}{2} & \frac{x_{15}}{2} \\ \frac{x_9}{2} & \frac{x_{12}}{2} & \frac{x_{14}}{2} & x_{20} & \frac{x_{16}}{2} \\ \frac{x_{10}}{2} & \frac{x_{13}}{2} & \frac{x_{15}}{2} & \frac{x_{16}}{2} & x_{21} \end{bmatrix}$$

$$X = \begin{bmatrix} 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \\ 1 & \text{pH} & a & b & c & d & \text{pH}*a & \text{pH}*b & \text{pH}*c & \text{pH}*d & a*b & a*c & a*d & b*c & b*d & c*d & \text{pH}^2 & a^2 & b^2 & c^2 & d^2 \end{bmatrix}$$

'b' is defined as:

$$b = \begin{bmatrix} x_2 \\ x_3 \\ x_4 \\ x_5 \\ x_6 \end{bmatrix}$$

If an optimal operating point is found within the scope of the RSM experiment, this point is evaluated as the final result of the steepest descent algorithm. An additional CCD experiment may be conducted centered at the operating point to confirm that this is the minimum point.

Values for the application of treatments determined at any stage during the commissioning process or normal operation, such as the control parameters described above, may be uploaded to a remote server, by either suitable cabled or wireless apparatus. The collection of these parameters may be used, either individually or in aggregate, to develop or improve the accuracy of the initial default settings, such as an "Abattoir" or "Dairy" setting.

During the "Automatic Commissioning" period, the progress of the automatic commissioning may be represented on the controller display, on a status/overview page, with a progress bar. This progress will be calculated based on the completed and remaining expected RSM tests to complete.

After completion of the 'Automatic Commissioning' phase, the controller 310 begins to run chemical dosing based on the input TSS as dictated by the RSM response surface. As will be evident to the skilled addressee, alternative outputs such as turbidity, colour and chemical oxygen demand may be used in lieu of TSS, to name a few. The precise mix of chemicals used may vary depending on the particular water treatment application, but for a DAF water treatment system, the chemical mix will typically include a flocculant, a coagulant, an acid and/or a base. The controller 310 may dose a pH modifier at the outlet of the DAF system using a PID loop based on a configurable pH set point. In some embodiments, the controller 310 may also dose an oxidant to the DAF system outlet based on a configurable pump speed set point or using a PID loop based on sensory data such as that obtained using an oxygen reduction potential sensor, as one possible option.

During normal system operation, the controller 310 continues to generate a more precise response surface directly around the current set point by performing full factorial tests with minute changes to the controlled variables. This will result in small deviations from the set point, within a tolerance. This serves to provide an accurate and updated response surface for the output TSS upon completion of the commissioning phase.

The operation of controller 310 can be toggled with a button on the main menu, depicted on the controller display or performed remotely. This button toggles between "Run" and "Shutdown" based on the current operating state of the controller 310. The operation of controller 310 can also be terminated using a signal from the client's program/system to a dedicated digital input on controller 310, allowing any external alarms raised by the customer's systems to shut down the controller 310 automatically.

In one embodiment, the controller 310 can be put into a "Manual" mode at any time, including during automatic commissioning. When in Manual mode, the controller 310 ceases to operate automatically. When the user accesses the DAF overview screen in Manual mode, any input can be varied either by changing the set points under the settings menu or by tapping on the desired graphic on the overview screen and changing its set point via a popup keypad. If the controller 310 is in automatic commissioning before entering Manual Mode, any test that is currently being performed will be terminated and restarted once Manual Mode is switched off.

During normal operation, the flocculant and/or coagulant (again, note that chemicals performing a similar function to those described could be applied) dosing is based on the RSM results. In some forms, a ramping function may be applied to increase the dosage of the flocculant and/or coagulant if the system determines that a water metric (e.g. TSS) increases beyond a predetermined threshold to ensure that the system is not under dosing the flocculant and/or coagulant during operation mode. In the event that the DAF inlet process composition changes from the typical process that was tested in the RSM auto commissioning phase, the flocculant and/or coagulant dosing factor increases slowly as the outlet TSS deviates from the expected result. If the flocculant and/or coagulant dosing factor is greater than 1, then the dosing factor automatically decreases after set time intervals. This will allow the dosing factor to return to 1.0 once the variance in the process ceases.

Figure 4:
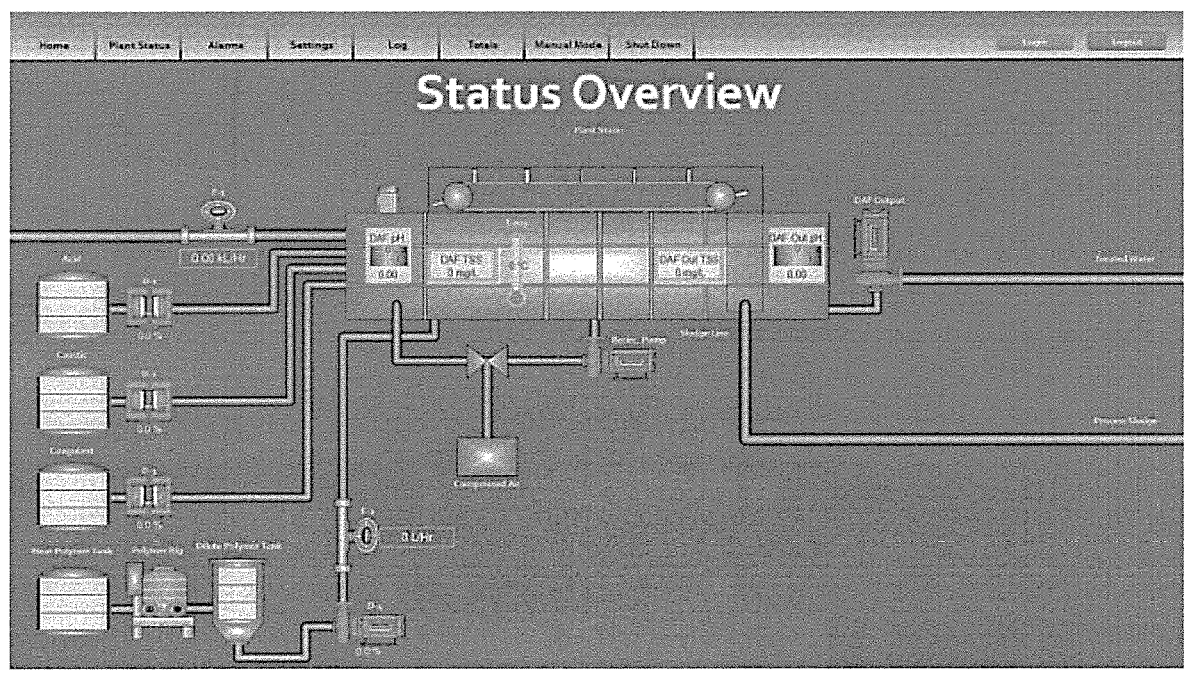
FIG. 4 is a screens hot from a display of a controller according to a representative embodiment of the present invention.

The controller may display real-time measurements of the system on a touch-screen 315 as ongoing status information, as shown in FIG. 4. Furthermore, as previously discussed, the controller 310 may be equipped with communication apparatus to allow remote access to real-time measurements of the system (by an authorized person). The remotely monitored parameters may include:
  (a) Relevant input parameters (TSS, temperature, pH, flow rate etc.).
  (b) System derived input parameters (e.g. time weighted average values).
  (c) Chemical dosing rates.
  (d) Relevant output parameters (TSS, pH etc.).
  (e) System derived output parameters (e.g. time weighted average values).
  (f) Active alarms and events in a chronological list.
  (g) Live video feed of the process.
  (h) Tantalization of parameters, feed and chemical flows to obtain savings to date.

Remote monitoring may be available by means of either suitable cabled apparatus (e.g. Ether net), or by wireless apparatus (in this embodiment, a 4G cellular service). The remote monitoring information may be provided to a mobile communication device, and may be viewable by a user on an app.

Figure 5:
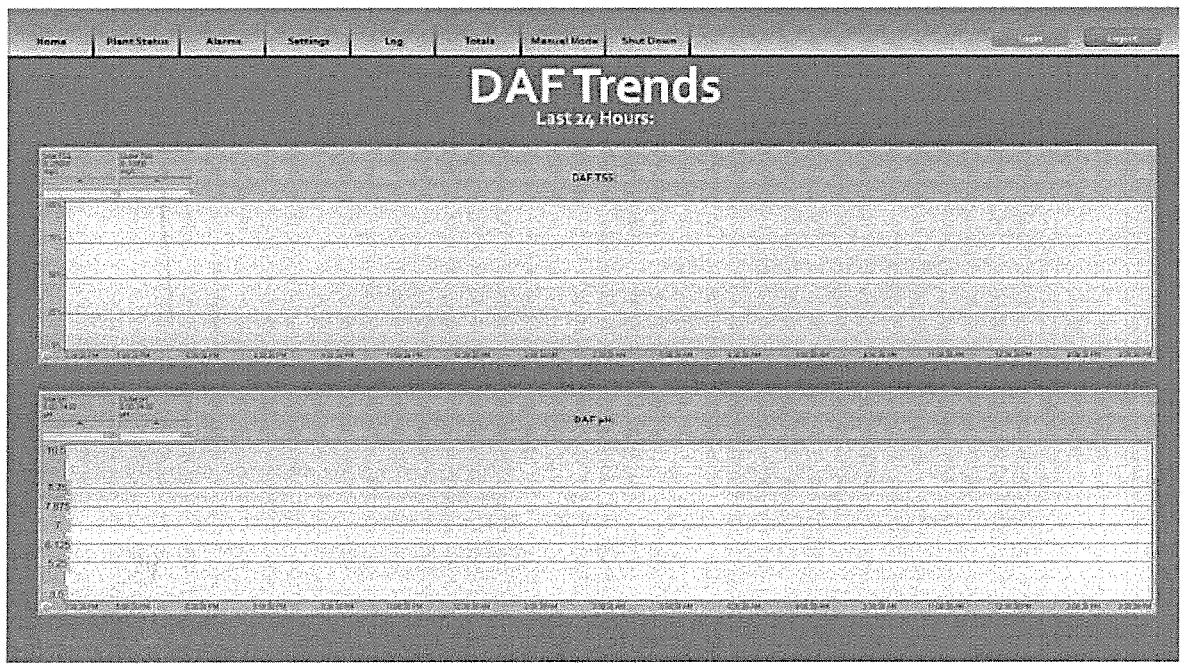
FIG. 5 is a screens hot from a display of a controller according to a representative embodiment of the present invention.

The Controller 310 may keep a log of all important sensor data and internal variables, alarms, set points, calculated totaled flow, dosing curve data, and optionally backup this data remotely (i.e., to a server located remotely from the system). The controller 310 display may also be configured to display a log of important values over the past 24 hours in graphical format under the trend graph pages, as shown for example in FIG. 5 (values not depicted). The values may include:
  (a) Relevant inlet sensor data (e.g. TSS, temperature, pH, flow rate etc.);
  (b) Values for the application of treatments from the treatment sources (e.g. chemical dosing rates);
  (c) Relevant outlet sensor data (e.g. TSS, pH etc.);
  (d) Alarms and events in a chronological list;
  (e) Short video clips corresponding to the onset of an alarm (e.g. drive failure, sludge overflow etc.); and/or
  (f) Time-weighted average and peak values of all relevant data.

Periodic reporting may also be provided, for example setting out minimum, maximum, and average values collected for that period.

Relevant information stored on the Controller 310 may be transmitted to a remote server, by either suitable cabled or wireless apparatus, where it may be stored in a database. The controller may also retrieve from a remote server data, including (but not limited to):

(a) Relevant inlet sensor data (e.g. TSS, temperature, pH, flow rate etc.);
(b) Values for the application of treatments from the treatment sources (e.g. chemical dosing rates);
(c) Alarms and events in a chronological list; and/or
(d) Chemical cost data.
(e) Operating parameters.

As previously described, a live video feed of the operation of the DAF system may be provided by an internet protocol (IP) enabled camera mounted at a vantage point housed either on the control cabinet 300 or elsewhere where a good vantage of the water treatment apparatus may be obtained. The video footage may be stored on the hard drive or solid state drive of controller 310, using appropriately sized local storage. If the memory allocated to video storage on controller 310 becomes full, the oldest footage may be overwritten by new footage. The footage may be accessible to the end user from the controller display and may also be retrieved remotely from a remote connection to the controller 310.

Figure 7:
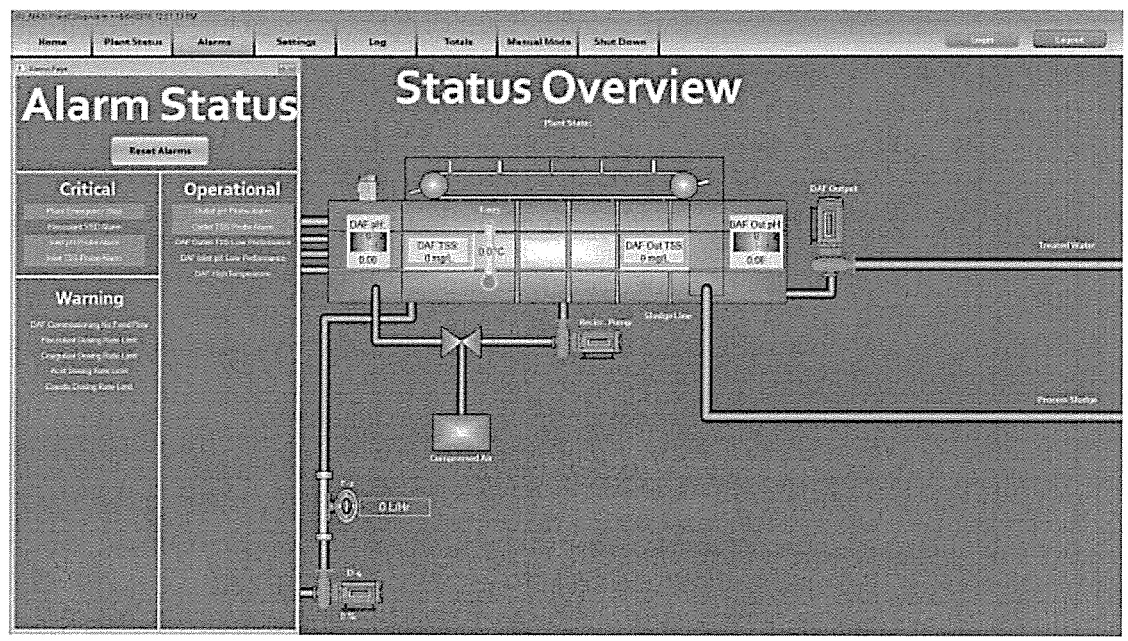
FIG. 7 is a screens hot from a display of a controller according to a representative embodiment of the present invention.

Alarm functionality may be provided if functional anomalies are detected—for instance, exceedance of threshold values, excessive rates of change in sensor data—as well as issues in output performance. An alarm indicator may be visible at all times on the controller display, with a page to show all active alarms as depicted in FIG. 7. Alarms may be reset using a reset button on the cabinet or remotely by an authorized user. Triggering events for alarms in different embodiments may include:

(a) Pushing of the emergency stop button;
(b) Triggering of mixer overload (if a mixer is used);
(c) Feedback from treatment sources (such as dosing pumps, if available) which are not reflecting output commands;
(d) Alarms from treatment sources (such as variable speed drive alarms of dosing pumps);
(e) Inlet and outlet sensors reading erroneously (e.g. reads as 0, or at max range);
(f) Outlet water quality metric exceeding the acceptable maximum for an extended period of time;
(g) No feed water flow is detected for an extended time period;
(h) Inlet/outlet pH not reaching the set point for an extended period of time;
(i) Temperature (if this data is available) is too high;
(j) Other alarms indicating mechanical or electrical failure of a component of the water treatment system, such as a DAF or its ancillaries.

Alarms may be distributed by email or text message (or by other communication means) to relevant persons, and the surveillance footage recorded over the time of the alarm may also be transmitted along with the alarm notification.

Figure 9:
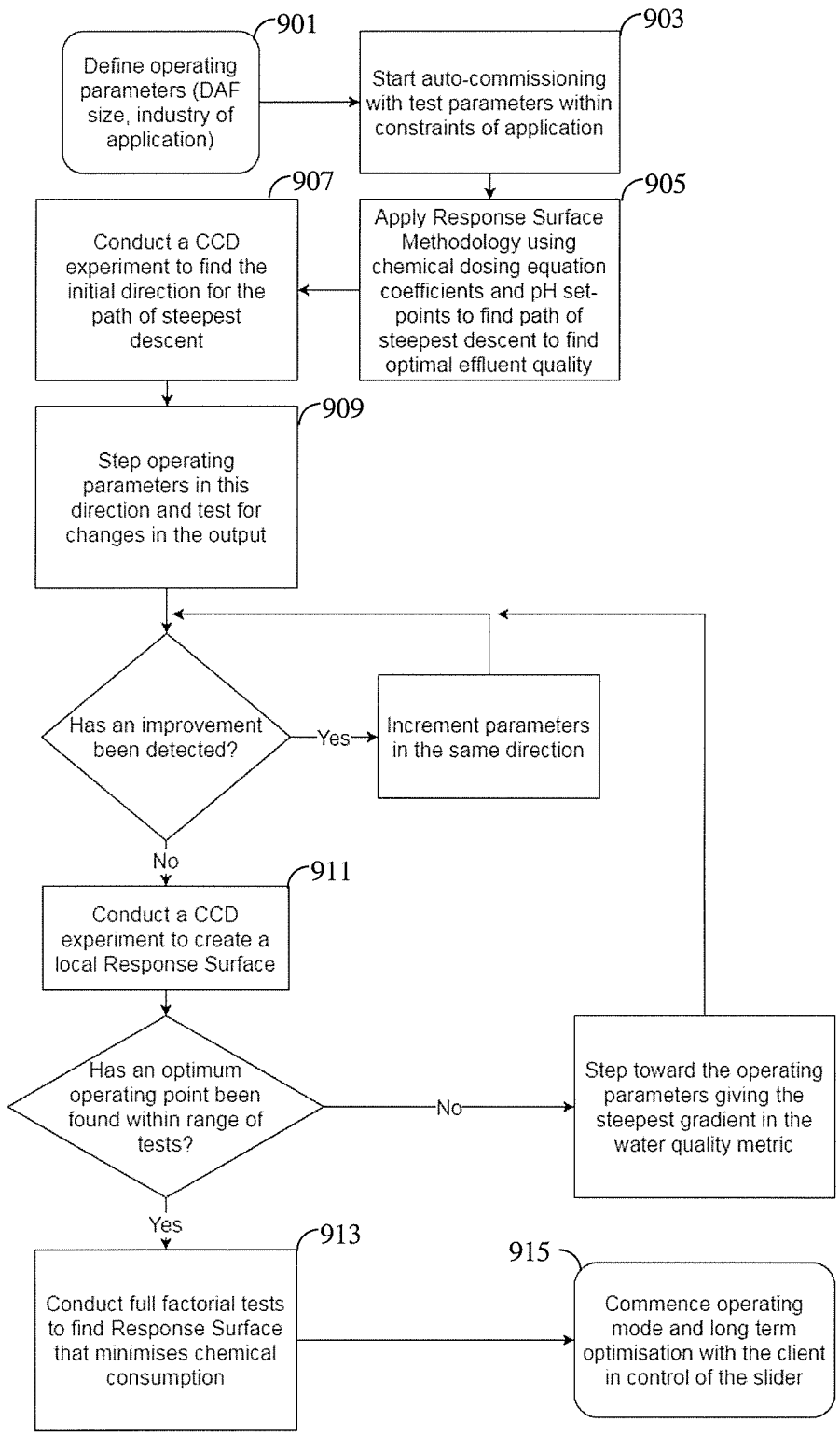
FIG. 9 is a flow diagram detailing an example logic sequence of the controller.

An example logic sequence of the controller will now be described with reference to FIG. 9. At step 901, the operating parameters (e.g. DAF size, industry of application, etc.) are defined. Auto-commissioning of the system is implemented at step 903 with predetermined test parameters within constraints of the application. Response surface methodology is then applied at step 905 using chemical and pH set-points to find the path of steepest descent to establish the optimal effluent quality for the application. A CCD experiment is then conducted at step 907 to find the initial direction for the path of steepest descent. The operating parameters are then adjusted in a step-wise manner at step 909 in the direction established during the CCD experiment and a test is conducted to determine if any changes occur at the output. If an improvement in the system is detected, the operating parameters are again adjusted in a step-wise manner in the same direction and another test is conducted to determine if any changes occur at the output. Incremental changes are made (i.e. tests are performed iteratively) until a specified improvement (e.g. no improvement or very little improvement) is detected. A CCD experiment is then conducted at step 911 to create a local response surface. If an optimal operating point has not been established, the system returns to step 909. If an optimal operating point has been established, full factorial tests are conducted at step 913 to find the response surface that minimizes chemical consumption and then operating mode 915 (e.g. the second mode) commences and long term optimization with the client in control of the slider is established.

Figure 10:
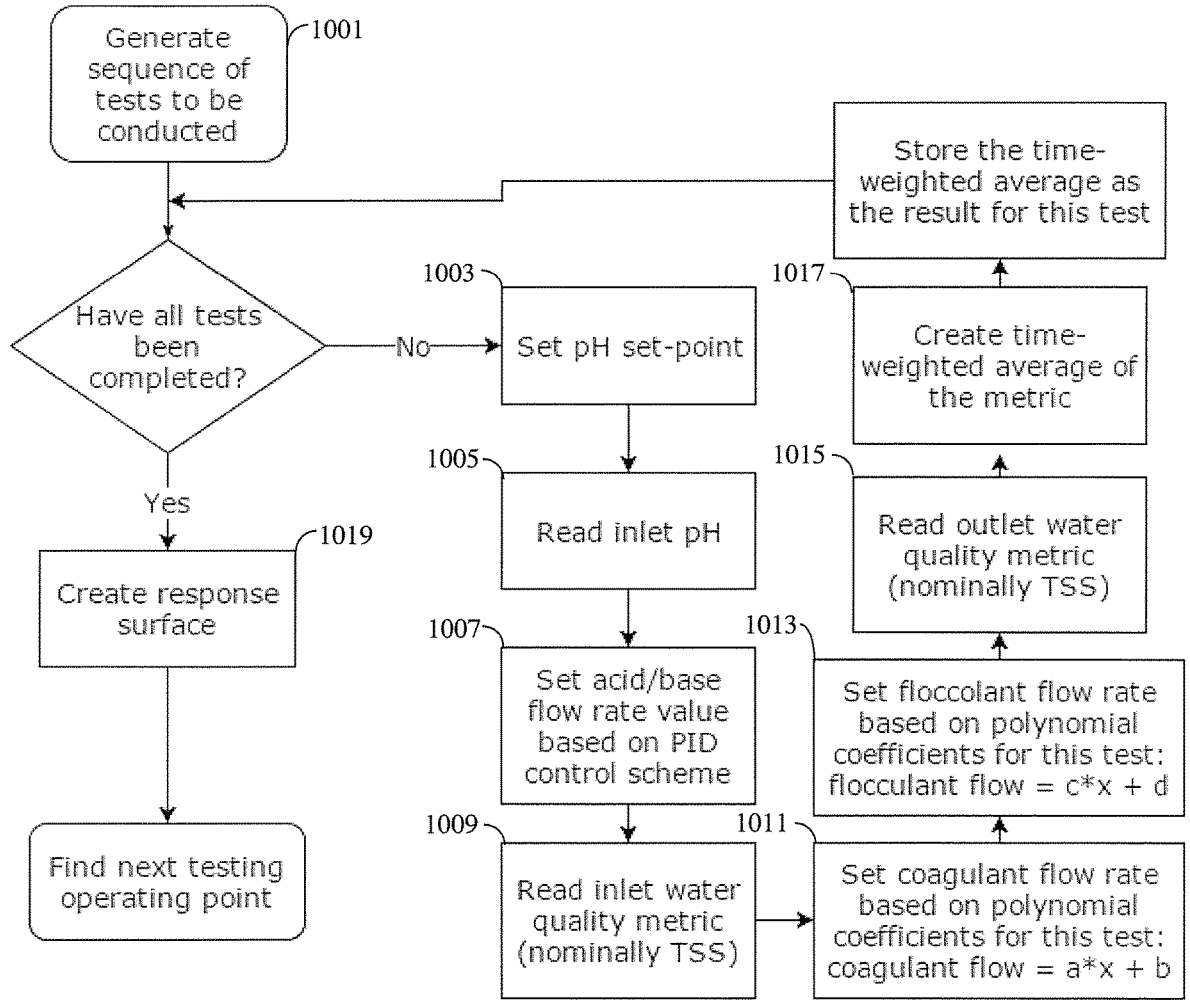
FIG. 10 is an example flow diagram of the RSM process.

An example flow diagram of the RSM process will now be described with reference to FIG. 10. At step 1001, a sequence of tests to be conducted is generated. The pH is then set at step 1003 to a defined set-point and the inlet pH is determined at step 1005. At step 1007, the acid/base flow rate valued is set based on a PID control scheme. The inlet water quality metric (e.g. TSS) is then determined at step 1009 after which the coagulant flow rate is set based polynomial coefficients for a test (e.g. coagulant flow=a*x+b) at step 1011. At step 1013, the flocculant flow rate is set base on the polynomial coefficients for a test (e.g. flocculant flow=c*x+d) and then at step 1015, the outlet water quality metric (e.g. TSS) is determined. At step 1017, a time-weighted average of the metric is created and stored. Steps 1003 to 1017 are performed iteratively until all of the test have been completed, after which a response surface is created at step 1019 and then the next testing operating point is determined.

Example 1

The present invention was tested on waste water generated at an abattoir. The waste water from the abattoir contained high levels of fats and proteins which contributed to a high level of TSS in the effluent. At the abattoir, this value, measured in parts per million (ppm), fluctuated constantly between 6,000 and 30,000 ppm, with the average value being approximately 10,000 ppm.

Discharging an effluent stream with a high TSS count can be very costly for a client as part of the discharge cost, as prescribed by the relevant water authorities, is directly proportional to the TSS concentration of the discharged effluent. As a result, the managers of the abattoir opted to treat their waste water to reduce the TSS levels prior to discharging it. Prior to testing the present invention, the managers of the abattoir used a manually operated DAF system to treat the effluent stream, with the chemistry determined by an operator through jar testing.

Prior to testing the present invention at the abattoir, an operator would perform a number of jar tests using chemicals supplied by a specialist chemical provider. These jar tests needed to be carried out regularly, in response to dynamic inlet composition and flow rate variations signaled by a visible decline in the clarity of the waste water, in particular, following significant changes in upstream conditions, e.g. The abattoir moving to a different stage of the process. The outlet TSS levels achieved pursuant to regular jar tests by an operator fluctuated between approximately 200 ppm and 1200 ppm.

Before the present invention was tested at the abattoir, jar tests were conducted using the waste water. The mixture of dosing chemicals that resulted in the highest separation of solids in these jar tests was chosen as the starting point for the present invention. From this starting point, the present invention automatically began iteratively adjusting the relative flow rates of the dosing chemicals to try to achieve the lowest TSS levels for the treated water. No further human input or supervision was required.

At the time of this specification, the present invention had been tested at the abattoir for more than 6 months. The present invention reached the optimum chemical dosing mixture in about 48 hours, after approximately 60 iterations, which yielded outlet TSS levels of 91 ppm. In comparison, most operators would only be able to achieve outlet TSS levels between 200 and 300 ppm at best and would not be able to maintain this consistently. Additionally, this may change significantly when the composition of the inlet water changed as operators are not able to monitor this as precisely and regularly as an automated process with in-situ sensors.

Table 1 below summaries the change in outlet TSS levels at each iteration from immediately after the present invention was connected, until the auto commissioning stage was completed.

TABLE 1

Performance of the present invention from commissioning until reaching the optimum chemical dosing mixture

| Inlet TSS (ppm) | Outlet TSS (ppm) | Outlet TSS reduction (%) | Waste water flow rate (m3/h) |
|---|---|---|---|
| 5299 | 446 | — | 80 |
| 6056 | 141 | 98 | 80 |
| 5543 | 164 | 97 | 80 |
| 19219 | 201 | 99 | 80 |
| 1758 | 613 | 65 | 80 |
| 562 | 156 | 72 | 80 |
| 7302 | 596 | 92 | 80 |
| 7106 | 399 | 94 | 80 |
| 6887 | 223 | 97 | 80 |
| 6764 | 162 | 98 | 80 |
| 5934 | 135 | 98 | 80 |
| 5763 | 134 | 98 | 80 |
| 6642 | 124 | 98 | 80 |
| 8547 | 125 | 99 | 80 |
| 5739 | 111 | 98 | 80 |
| 5763 | 115 | 98 | 80 |
| 6081 | 118 | 98 | 80 |
| 6398 | 162 | 97 | 80 |
| 5543 | 129 | 98 | 80 |
| 4860 | 161 | 97 | 80 |
| 3858 | 182 | 95 | 80 |
| 2711 | 200 | 93 | 80 |
| 1807 | 202 | 89 | 80 |
| 2149 | 171 | 92 | 80 |
| 5299 | 237 | 96 | 80 |
| 82784 | 444 | 99 | 80 |
| 11990 | 6417 | 46 | 80 |
| 2247 | 246 | 89 | 90 |
| 1197 | 160 | 87 | 90 |
| 2100 | 137 | 93 | 86 |
| 3565 | 117 | 97 | 90 |
| 4249 | 99 | 98 | 90 |
| 4322 | 100 | 98 | 88 |
| 5397 | 97 | 98 | 90 |
| 6325 | 113 | 98 | 90 |
| 16606 | 98 | 99 | 88 |
| 6691 | 111 | 98 | 85 |
| 5788 | 101 | 98 | 90 |
| 5861 | 105 | 98 | 90 |
| 7180 | 124 | 98 | 90 |
| 7106 | 5080 | 29 | 88 |
| 806 | 486 | 40 | 54 |
| 4249 | 121 | 97 | 90 |
| 5128 | 1887 | 63 | 90 |
| 4444 | 106 | 98 | 87 |
| 4054 | 116 | 97 | 86 |
| 4029 | 116 | 97 | 85 |
| 4176 | 132 | 97 | 82 |
| 3907 | 139 | 96 | 83 |
| 4567 | 142 | 97 | 83 |
| 4884 | 148 | 97 | 81 |
| 5079 | 153 | 97 | 82 |
| 5495 | 157 | 97 | 90 |
| 5910 | 161 | 97 | 90 |
| 5372 | 177 | 97 | 90 |
| 3981 | 183 | 95 | 90 |
| 3468 | 399 | 88 | 90 |
| 4103 | 136 | 97 | 90 |
| 4005 | 115 | 97 | 87 |
| 4347 | 100 | 98 | 80 |
| 25250 | 203 | 99 | 68 |
| 10598 | 91 | 99 | 80 |

Table 2 below contains a summary of the projected annual savings at the abattoir, based on the results of testing the present invention on-site.

TABLE 2

Estimated annual savings generated by the present invention

| Category | Details | Annual cost (Before) | Estimated annual cost (After) |
|---|---|---|---|
| Chemicals | Sulphuric Acid (98%) | $70,200 | $25,500 |
| | Caustic Soda (46%) | $213,000 | $28,800 |
| | Poly Aluminium Chloride (10%) | $46,800 | $0 |
| | Flocculant | $213,300 | $94,800 |
| Labour | Operator | $156,000 | $5,200 |
| Waste water discharge costs | Council charges | $1,230,000 | $330,000 |
| | Total costs | $1,929,300 | $484,300 |
| | Overall estimated annual savings | | $1,530,500 |

After approximately 6 months of testing the present invention at the abattoir, the quantity of chemicals required to treat the waste water was reduced significantly leading to substantial cost savings. In addition, the present invention determined that the optimum chemistry for the waste water at this abattoir did not require a coagulant, removing the need to utilize the coagulant—which would equate to an estimated saving of about AU$47,000 per annum. Besides reducing the quantity of the required dosing chemicals at the abattoir, the present invention would also generate considerable savings in other areas, including labor and trade waste discharge costs.

Parts of the software and system components may be housed in the "cloud". This embodiment of the system is implemented by appropriate software providing instructions for operation of the computing system hardware to implement the system and methods of the detailed embodiment. Part of the system or the entire system may be portable, and may be implemented, for example, by a laptop or tablet computing device, smartphone or other portable computing device.

In some forms, the system may conclude that particular dosing chemicals are not required to meet the objectives of the user. In this instance, the operating cost of the system is significantly reduced as dosing chemicals that may previously have been considered as important to the treatment of feed water, are no longer required. Further, the system can provide substantial water quantity savings for users. For example, the treated water can be used as non-potable water supply for irrigation, washing of truck bays, etc. If the treated water undergoes further treatment downstream, such as disinfection and reverse osmosis, the water can be used in more applications such as makeup water for a cooling tower.

In at least one embodiment, the disclosed system performs a full factorial during modeling to determine the lowest chemical cost as well as to generate a slider.

The system has been described with reference to waste water treatment (e.g. the treatment of effluent from oil refineries, petrochemical and chemical plants, natural gas processing plants, paper mills and general water treatment). The system has analogous applications in other processing methods that also use DAF, or very similar, systems, such as the processing of mineral ores and other such solid extraction processing methods. For example, the system can be utilized to increase the yield of an input fluid, such as a mineral solids stream, to capture high value components in the input fluid, such as extracting mineral ores from a mineral solids stream. In this instance, the DAF system would be set-up to reduce the TSS to extract the high value solids in the sludge. This analogous use of the system is similar to the use of the disclosed system for waste water treatment, whereby the feed water is highly treated/clarified to either obtain highly clarified output water. When treating an input fluid for mineral ore extraction, the minerals of interest would be separated from the fluid in a sludge that is extracted from the DAF. Thus, the disclosed system, depending on the configuration, could be used to selectively extract components in a fluid stream, to obtain a sludge with a high concentration of required minerals.

The word 'comprising', and forms of the word 'comprising', when used in this specification is taken to specify the presence of stated features, integers, steps or components but does not preclude the presence or addition of one or more other features, integers, steps, components or groups thereof.

In this specification, where a document, act or item of knowledge is referred to or discussed, this reference or discussion is not an admission that the document, act or item of knowledge or any combination thereof was at the priority date, publicly available, known to the public, part of the common general knowledge; or known to be relevant to an attempt to solve any problem with which this specification is concerned.

The invention claimed is:

1. A water treatment system for use in-situ with an apparatus which receives feed water and releases treated water, the system comprising:
   one or more in-situ feed water sensors in the apparatus to measure in substantially real-time a water quality metric of the feed water;
   one or more treatment sources to apply one or more treatments to the feed water in the apparatus;
   one or more in-situ treated water sensors in the apparatus to measure in substantially real-time a water quality metric of the treated water; and
   a processor and memory, the memory storing instructions that, when executed by the processor, cause the system to:
      receive data associated with the water quality metric of the feed water from the one or more in-situ feed water sensors and data associated with the water quality metric of the treated water from the one or more in-situ treated water sensors; and
      control the application of treatments from the one or more treatment sources;
   the memory storing further instructions that, when executed by the processor, cause the system to operate in a first mode, and then either in the first mode or in a second mode, wherein in the first mode, the system:
   (a) implements the application of the one or more treatments from the treatment sources in accordance with an initial set of values and then monitors in substantially real-time the water quality metric of the treated water using the one or more in-situ treated water sensors;
   (b) conducts a series of tests in-situ in which the application of each of the treatments to the feed water in the apparatus is systematically varied from the initial value and then monitors in substantially real-time the water quality metric of the treated water using the one or more in-situ treated water sensors;
   (c) generates a model of the relationship between the application of the treatments and the water quality metric of the treated water;
   (d) selects a set of commissioning values from the model for the application of the one or more treatments that correspond to a best value for the water quality metric of the treated water;
   (e) repeats steps (a) to (d) using the set of commissioning values from step (d) as the initial set of values until either
      (i) the water quality metric of the treated water falls within a pre-determined distance from the water quality value, or
      (ii) there is no measurable improvement in the water quality metric as the application of the treatments is varied;
   (f) if during step (e)
      (i) the water quality metric of the treated water does not fall within the pre-determined distance from the water quality value, and
      (ii) the processor determines that there is no measurable improvement in the water quality metric as the application of the treatments is varied,
   then the system selects a further set of commissioned values for the application of the treatments which provides a desired water quality result and then repeats steps (a) to (e) using the further set of commissioning values as the initial set of values;
   and wherein once the water quality metric of the treated water falls within the pre-determined distance from the water quality value in step (e), in the second mode, the system:
   (g) outputs instructions to the one or more treatment sources to apply the treatments using the commissioned set of values and continues to monitor in-situ in substantially real-time the water quality metric of either or both the feed water and the treated water; and
   (h) if the processor subsequently detects that the water quality is outside
   (i) the predetermined distance from the desired water quality result, and/or (ii) a pre-determined range from water quality value in step (e), for a pre-determined period of time, then the processor will implement the first mode again.

2. The water treatment system according to claim 1 wherein the tests involve varying the application of the treatments within a specified range from the initial value and the models are generated using response surface methodology.

3. The water treatment system of claim 1, wherein the apparatus includes a dissolved air flotation device (DAF).

4. The water treatment system of claim 1, wherein the water quality metric is total suspended solids (TSS).

5. A computer implemented method for treating feed water in a water treatment system, comprising:
 a first mode and a second mode, wherein the system operates in the first mode and then either in the first mode or in the second mode,
 wherein the first mode comprises:
  (a) applying one or more treatments from one or more treatment sources in accordance with an initial set of values and monitoring in substantially real-time a water quality metric of the treated water in-situ in the water treatment system;
  (b) conducting a series of tests in-situ in the water treatment system in which the application of each of the treatments is systematically varied from the initial value and monitoring in substantially real-time the water quality metric of the treated water;
  (c) generating a model of the relationship between the application of the treatments and the water quality metric of the treated water;
  (d) selecting a set of commissioning values from the model for the application of the one or more treatments that correspond to a best value for the water quality metric of the treated water;
  (e) repeating steps (a) to (d) using the set of commissioning values from step (d) as the initial set of values until either
   (i) the water quality metric of the treated water falls within a pre-determined distance from the water quality value, or
   (ii) there is no measurable improvement in the water quality metric as the application of the treatments is varied; and
  (f) if after step (e)
   (i) the water quality metric of the treated water does not fall within the pre-determined distance from the water quality value, and
   (ii) there is no measurable improvement in the water quality metric as the application of the treatments is varied,
  selecting a further set of commissioned values for the application of the treatments which provides a desired water quality result;
 wherein once the water quality metric of the treated water falls within the pre-determined distance from the water quality value in step (e), subsequently the second mode comprises;
  (g) applying the treatments using the commissioned set of values and continuing to monitor in-situ in substantially real-time the water quality metric of either or both of the feed water and the treated water in the apparatus; and
  (h) if subsequently the water quality metric is
   (i) outside the desired water quality result, and/or
   (ii) outside a pre-determined range from the water quality value in step (e),
  for a pre-determined period of time, implementing the first mode again, wherein the water treatment system includes a communication apparatus to transmit and/or receive data and/or messages to/from a remote device, said data including the monitored water quality metric and/or the values for the application of the treatments.

* * * * *